(12) United States Patent
Lutz

(10) Patent No.: US 7,913,652 B1
(45) Date of Patent: Mar. 29, 2011

(54) ELEVATING ANIMAL BATHING TUB

(76) Inventor: Robert G. Lutz, Iola, WI (US)

( * ) Notice: Subject to any disclaimer, the term of this patent is extended or adjusted under 35 U.S.C. 154(b) by 64 days.

(21) Appl. No.: 12/586,302

(22) Filed: Sep. 21, 2009

(51) Int. Cl.
*A01K 13/00* (2006.01)

(52) U.S. Cl. ......................................................... 119/674

(58) Field of Classification Search ................... 119/674, 119/753, 673, 61.53, 61.54
See application file for complete search history.

(56) References Cited

U.S. PATENT DOCUMENTS

| | | | |
|---|---|---|---|
| 4,594,747 A * | 6/1986 | Dempsey | 15/301 |
| 4,896,627 A * | 1/1990 | Riddell | 119/51.5 |
| 6,230,657 B1 * | 5/2001 | Read | 119/502 |
| 7,044,086 B2 * | 5/2006 | Fisher | 119/843 |
| 7,198,007 B2 * | 4/2007 | Bestelmeyer | 119/673 |
| 2007/0295285 A1 | 12/2007 | Smith et al. | |
| 2010/0170447 A1 * | 7/2010 | Pridgen, Jr. | 119/61.53 |

* cited by examiner

*Primary Examiner* — Yvonne R. Abbott
(74) *Attorney, Agent, or Firm* — Russell L. Johnson; Patent Agent

(57) ABSTRACT

An elevating animal bathing tub having an elevating platform and a tub formed of light weight strong material secured to the platform. The tub is provided with a downward directed skirt and the elevating platform is provided with an upward directed skirt that telescopes with the skirt on the tub to shield the elevating apparatus. The tub is provided with an entry cutout so that when the tub is in the lowered position an animal to be bathed can easily enter the tub. The tub is configured to accept utilities and attachments specific to the tasks to which the tub is to serve.

9 Claims, 5 Drawing Sheets

ELEVATING ANIMAL BATHING TUB

RELATED PATENT APPLICATIONS

This patent application is for a utility patent for which design patent Ser. Nos. 29/313,424 and 29/313,425 have been filed and allowed and have issued as U.S. Pat. Nos. D598,078 and D598,079.

BACKGROUND OF THE INVENTION

1. Field of the Invention

This invention relates to tubs for bathing animals.

More specifically, this invention relates to elevating tubs for bathing animals wherein the elevation of the tub above a floor can be adjusted to accommodate for the range of sizes of animals to be bathed and the height of the service provider.

Still more specifically, this invention relates to elevating tubs as described above wherein the elevating mechanisms for raising and lowering the tub are enclosed in telescoping enclosures.

2. History of the Invention

Tubs for washing dogs and other pets built into cabinets and other fixed structures have long been known in the art. The vessels are typically a shallow stainless steel pan or tub mounted in a fixed cabinet and having an array of showers or sprays, dispensers, shields, curtains, tethers, restraints, pads, inserts, and the like. These tubs for washing pets are not ergonomically ideal. Their use requires the lifting and lowering of a sometimes reluctant pet to and from the vessel. Adjustable height pet grooming platforms are known in the art. The inventor's company, Ultra Lift® of Manawa Wis. produces adjustable height pet grooming tables.

The art has not heretofore provided a commercially successful adjustable height animal bathing vessel due in part to the many problems associated with providing the desired utilities to such a vessel and the weight and other stability problems associated therewith.

One aspect of the problem is that prior art stainless steel animal bathing tubs are heavy and when filled with water and a large animal, the center of mass of the tub, water, animal and apparatus combination becomes undesirably high, presenting a tipping hazard.

The provision of utilities such as water, electricity, drainage and the like to an adjustable height pet bathing tub also presents problems associated with both weight and the need to attach to flexible carriers of utilities.

It is an object of this invention to provide an adjustable height animal bathing tub which is light in weight and has a low center of gravity.

It is further an object of this invention to provide the tub as described above that is movable and can be accessible from all directions.

Other objects will be made obvious by the following specifications, drawings and claims.

BRIEF DESCRIPTION OF THE INVENTION

The invention in its most basic form is an animal bathing tub comprising: a free standing, adjustable height stand having, a base that is parallel to a floor and that is supported by the floor, a platform that is above the base and is substantially parallel to the base, apparatus for raising and lowering the platform relative to the base connected between the platform and the base; a light weight animal bathing tub secured to the platform, and the tub is provided with a downward directed skirt that surrounds the upper portion of the apparatus for raising and lowering the platform, and the base is provided with an upward directed skirt that surrounds the lower portion of the apparatus for raising and lowering the platform and the upward directed skirt and the downward directed skirt telescope within each other to permit the raising and lowering of the platform without exposing the apparatus for raising and lowering the platform, and wherein the tub is provided with a basin surrounded with a rim at the top of the basin and the rim is provided with an entry that permits the easy entry of an animal into the tub when the tub is in a lowered position and the entry is provided with a closure.

DETAILED DESCRIPTION OF THE INVENTION

Figure 1:
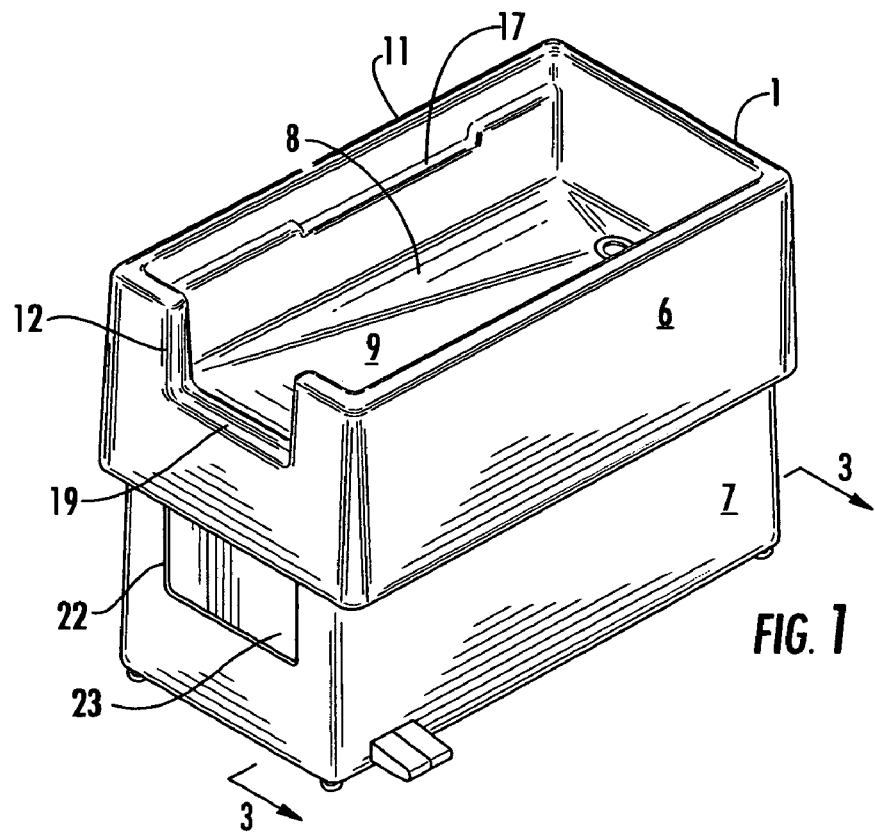
FIG. 1 is a perspective view of the tub of this invention in the raised position.

In the drawings like numbers refer to like objects, and the drawings are partially schematic and the proportions of some elements of the drawings have been modified to facilitate illustration and to remove nonessential details that would add unnecessarily to the number of drawings and cause the specifications to become prolix.

This invention is for an elevating animal bathing tub. That art has long provided elevating animal grooming tables. Attempts at making an elevating animal bathing tub by attaching an animal bathing tub to an elevating animal grooming table have heretofore been frustrated by numerous technical difficulties associated with making the combination. The most vexing problem is that of the weight of the conventional stainless steel tub full of water with a large animal in it has a relatively high center of gravity which creates a tipping hazard in a free standing unit. This problem is exacerbated by the need to attach utilities such as water lines and drains, electrical utilities, blower lines, and the like to a movable tub.

The inventor has solved the weight problem by fabricating his tub of molded fiberglass which has a weight that is less than one half that of an equivalent stainless steel tub. The flexibility of unsupported expanses of fiberglass was dealt with by using stiffening panels where needed.

Figure 2:
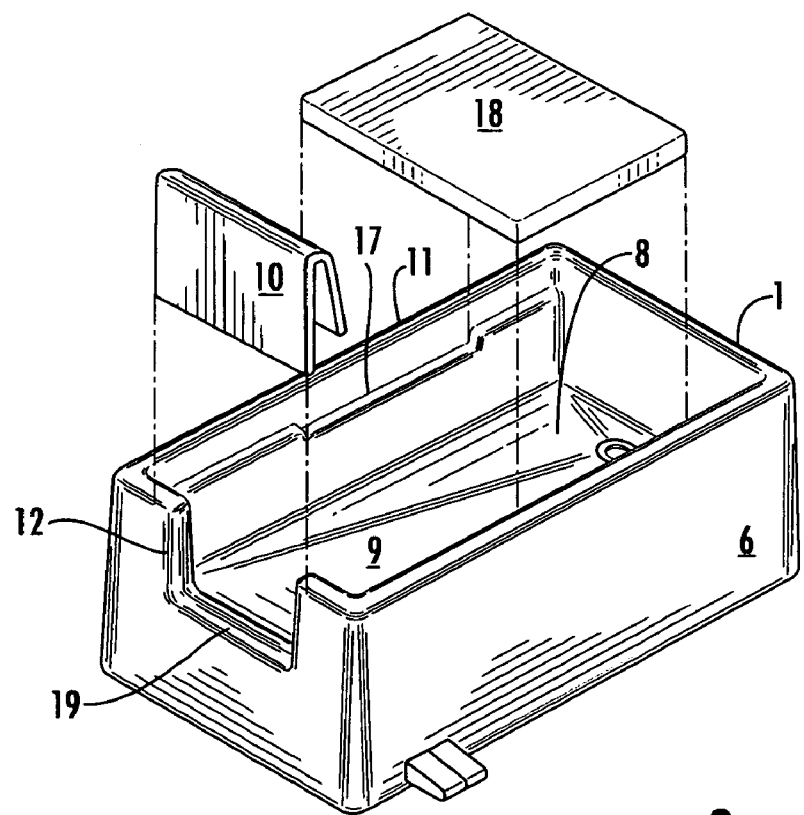
FIG. 2 is a perspective view of the tub of FIG. 1 in the lowered position.
Figure 3:
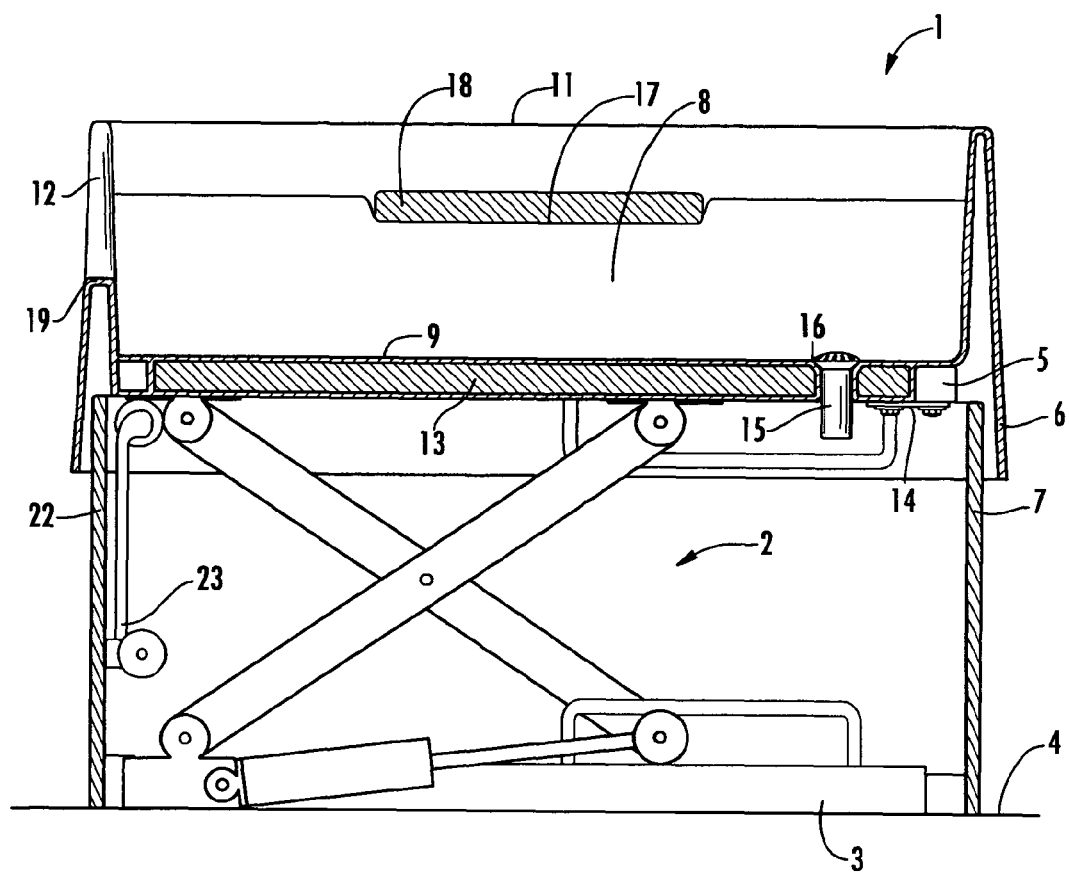
FIG. 3 is an elevation sectioned view of the tub of FIG. 1 taken along line 3-3.

FIGS. 1 through 3 show a free standing walk around embodiment of the invention that is configured to be positioned in a room so that the service providers can work from all sides of the tub.

The invention is for a free standing, adjustable height animal bathing tub 1 which has an apparatus 2 for raising and lowering tub 1 and apparatus 2 has a base 3 that is parallel to a floor 4 and base 3 is supported by floor 4; a platform 5 that is above base 3 and is substantially parallel to base 3; and apparatus 2 for raising and lowering platform 5 relative to base 3 is operably connected between platform 5 and the base 3.

Light weight animal bathing tub 1 is secured to platform 5.

Tub 1 is formed of molded fiberglass or light weight composite materials such as those used in aircraft construction or the like to provide a tub that is structurally strong at less than half the weight of stainless steel.

Tub 1 is provided with downward directed skirt 6 that surrounds the upper portion of apparatus 2 for raising and lowering platform 5, and base 3 is provided with an upward directed skirt 7 that surrounds the lower portion of apparatus 2 for raising and lowering platform 5 and the upward directed skirt 7 and downward directed skirt 6 telescope within each other to permit the raising and lowering of tub 1 without exposing apparatus 2 for raising and lowering platform 5.

Tub 1 is provided with a basin 8 surrounded with a rim 11 at the top of the basin and the rim is provided with an entry 12 that permits the easy entry of an animal into tub 1 when tub 1 is in a lowered position as shown in FIG. 2 and entry 12 is provided with a closure 10.

Prior art animal bathing vessels typically had a stainless steel animal bathing vessel secured to a table or counter which in turn was secured to a floor or wall or both. The animal to be bathed was lifted into and out of the vessel which presented a risk of injury to both the animal and the operator. The ideal animal bathing unit would be a movable, walk-around, adjustable height bathing vessel for bathing animals wherein the vessel could be lowered and the animal could step into the vessel and the vessel could be raised to a height that best suited the size of the animal and the operator. The achievement of such an ideal animal bathing unit was made difficult by the range of sizes and weights of the animals to be bathed, by the weight of the stainless steel animal bathing vessels and the quantity of water in them and by the need to provide a multiplicity of utilities to a movable table, and by the need to achieve the desired ends in a safe and economical way.

The adjustable height vessel of FIGS. 1 through 3 illustrates elements that are essential to achieving the movable, walk-around adjustable height, animal bathing vessel of this invention.

The combined weight of the animal bathing vessel, the animal, and the water in the vessel can become a tipping hazard when the vessel is raised above an unsecured base. This hazard us circumvented in this invention by forming tub 1 of a light weight and strong molded fiber glass construction or of one of the light weight but strong composite materials used in aircraft construction and by providing tub 1 with an entry threshold 6 that limits the amount of water that can accumulate in tub 1 thereby limits the weight being supported at a height above the base. When the vessel of this invention is being employed to bathe a large animal the height to which the vessel is raised is less than the height that the vessel would be raised for bathing a small animal further obviating the tipping issues associated with raising the center of mass of the animal bathing unit.

Figure 4:
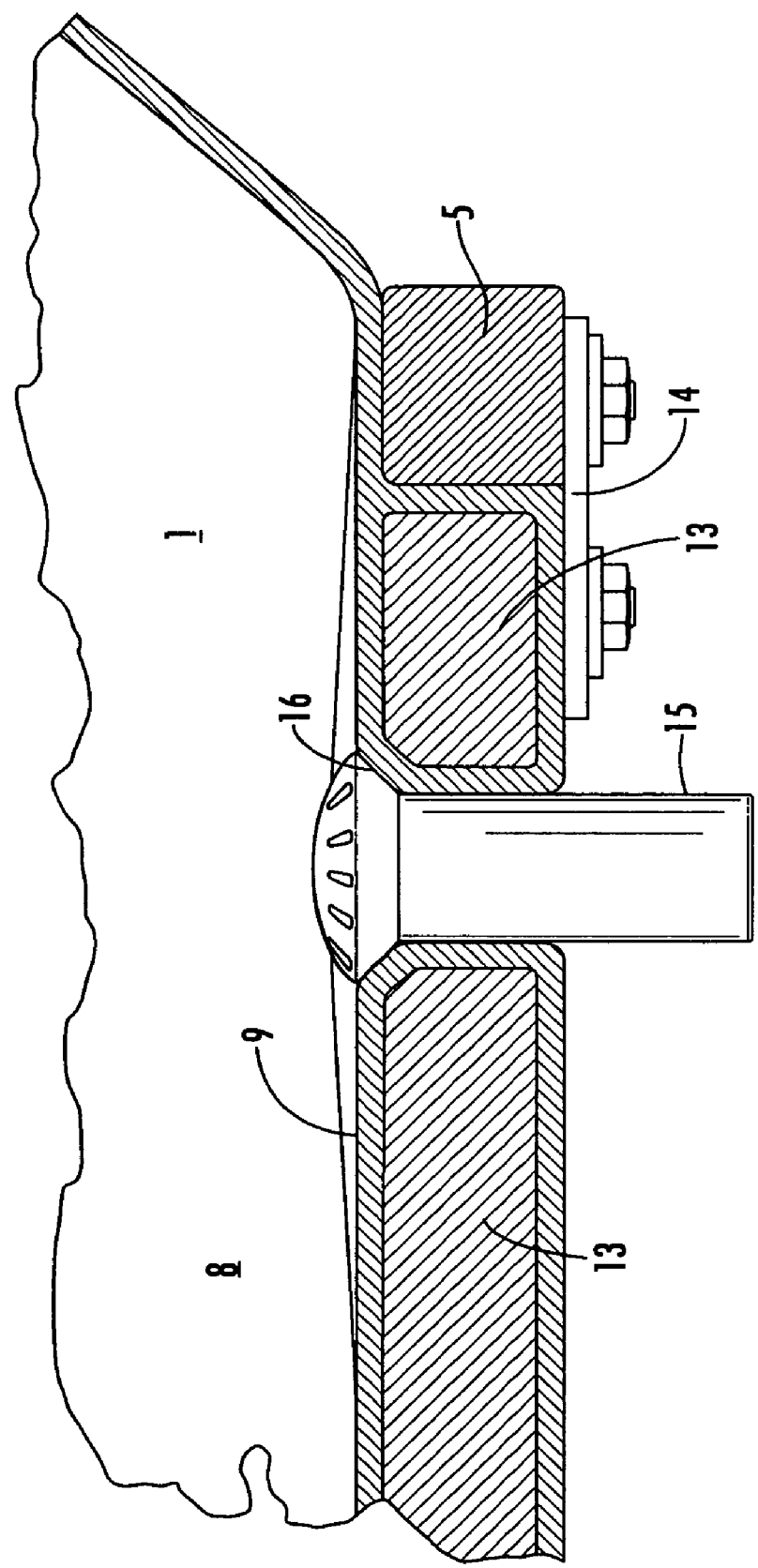
FIG. 4 is a fragmentary sectioned view of a stiffener panel in the bottom of a tub made according to this invention.

It is well known in the art that flat fiberglass panels are flexible and that panel stiffeners are used to shore up anchor points and to give stiffness to otherwise flexible fiberglass panels. Animals become unsettled on insecure or unstable footings. As shown in FIGS. 3 and 4, bottom 9 of basin 8 is provided with stiffener panel 13 which serves to stiffen bottom 9 and to provide an anchorage for attachment strap 14 which secures tub 1 to platform 5. As shown in the embodiment of FIGS. 1 through 4 of the invention, stiffener panel 13 is encased in the mold material of tub 1 and a drain seat 16 formed in stiffener panel 13 is molded into bottom 9 of basin 8 which provides a secure seat for drain 15.

Some dogs and most cats do not like to stand with their feet in water. As shown in FIGS. 1-3, tub 1 is provided with molded in shelves 17 upon which a removable platform 18 can be supported to permit an animal to stand on the platform above the water in basin 8.

Entry 12 provides a threshold 19 for an animal to enter tub 1 when the tub is in the lowered position. Skirt 7 is provided with a cutout opening 22 to permit threshold 19 to be lowered into skirt 7 and into the lowered position shown in FIG. 2. Cutout opening 22 is provided with a retractable closure 23 that functions much like a window shade to cover cut out opening 22 when tub 1 is a raised position as shown in FIG. 1.

The above disclosures are enabling and would permit one skilled in the art to make and use the invention for its intended purposes without undue experimentation. The elevating animal bathing tub of this invention can be given a wide range of configurations to serve the type of animal being bathed and the needs of a specific provider. The best mode of practicing the invention known to the inventor at the time of filing of this application would be one of those configurations.

The elevating animal bathing tub of this invention is movable in the sense that a major appliance such as a washer or dryer are movable. In many applications of this invention, it is desirable to position the unit near a wall where the utilities required for use of the unit are located and to provide the wall side and the two adjacent sides of the tub rim with raised splash guards and the operator side of the rim with the entry.

Figure 5:
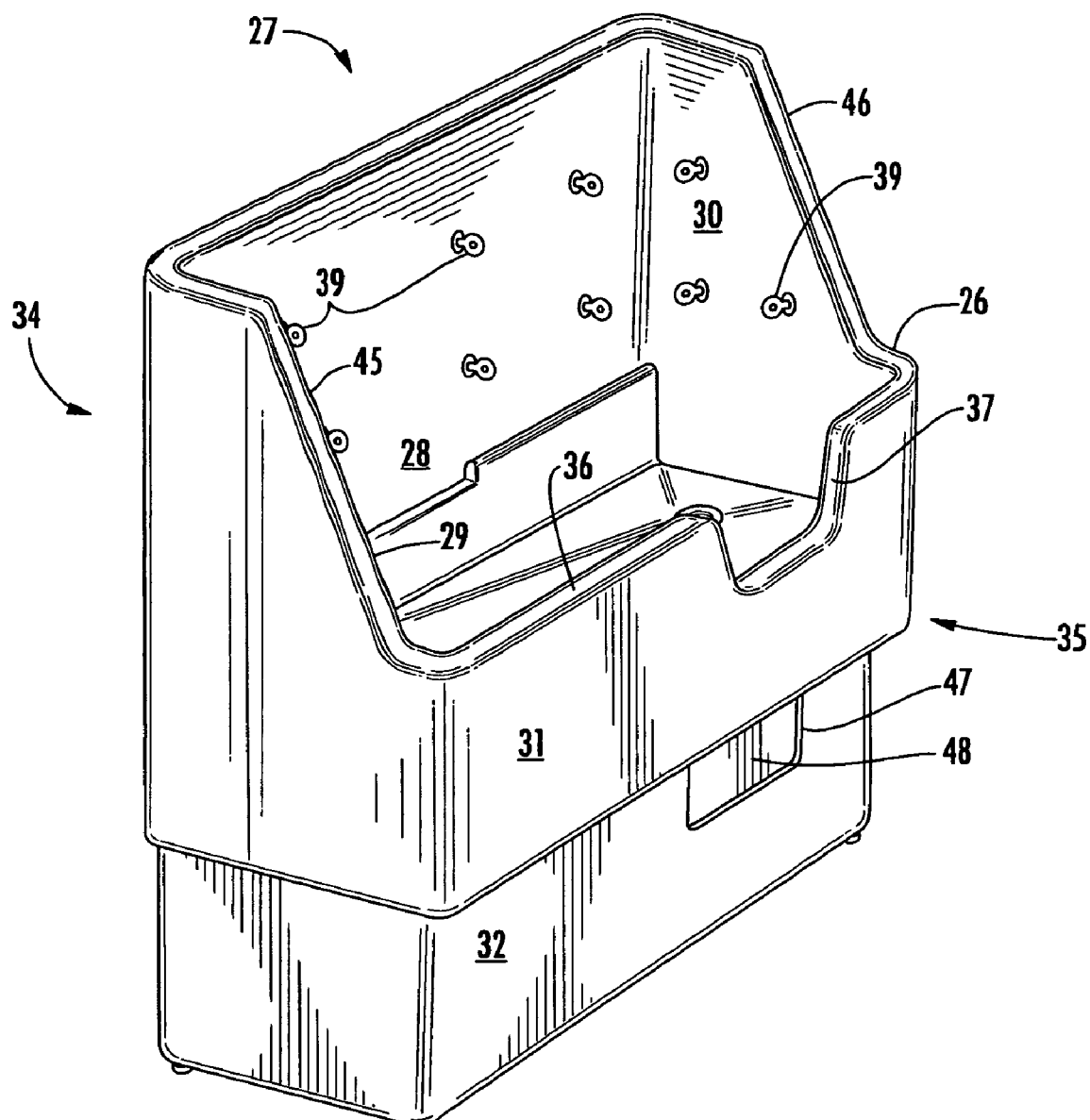
FIG. 5 is a perspective view of the operator side of a preferred embodiment of the invention.
Figure 6:
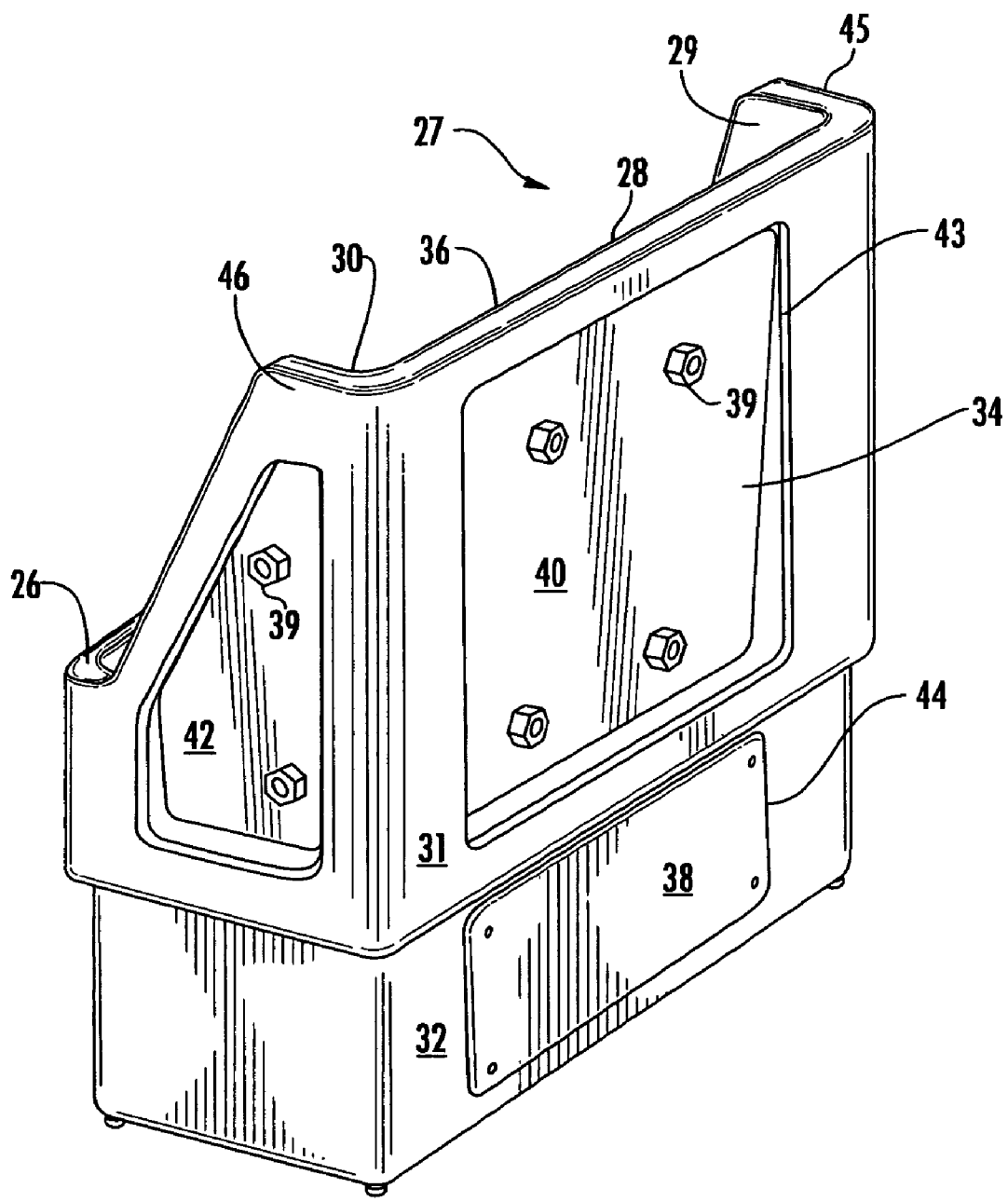
FIG. 6 is a perspective view of the wall side of the embodiment of FIG. 5.

Referring now to FIGS. 5 and 6 wherein a preferred embodiment of the invention is shown. Light weight animal bathing tub 26 is of the same general construction as tub 1 of FIGS. 1-4 and is provided with downward directed skirt 31 which telescopes with upward directed skirt 32 and on the operator side 35 of tub 26 rim 36 is provided with entry 37 and upward directed skirt 32 is provided with cutout opening 47 and retractable closure 48. Rim 36 is raised on wall side 34 of tub 26 and along adjacent sides 45 and 46 to form an integral splash guard 27 for tub 26.

Splash guard 27 has integral wall side panel 28 and adjacent first side panel 29 and adjacent second side panel 30.

Splash guard 27 serves to contain splashes that occur when bathing an animal and also serves as a support structure for numerous attachments that are of utility. In FIG. 5 splash guard 27 is shown to be provided with attachment rings 39. Attachment rings 39 can serve to hang brushes, combs, clippers and the like, and to attach restraints and tethers. Utilitarian attachments that serve the specific purposes of applications to which the tub of this invention can be applied can readily be mounted on panels 28, 29, and 30 of splash guard 27. As shown in FIG. 6, panels 28, 29, and 30 are provided with stiffener panels 40, 41, and 42 respectively (panel 41 not shown). The wall sides of downward directed skirt 31 and of upward directed skirt 32 are provided with access openings 43 and 44 respectively (access opening 44 is shown as covered with cover 38).

The elevating animal bathing tub of this invention admits of numerous variations without departing from the inventive concept disclosed above. Therefore, the scope of this invention should not be limited to the scope of the embodiments disclosed but the scope of this invention should only be limited to the scope of the appended claims and all equivalents thereto that would be made obvious thereby to one skilled in the art.

What is claimed is:

1. An adjustable height animal bathing tub comprising:
    a) a free standing, adjustable height stand having, a base that is parallel to a floor and that is supported by the floor, a platform that is above the base and is substantially parallel to the base, apparatus for raising and lowering the platform relative to the base connected between the platform and the base,
    b) a light weight animal bathing tub secured to the platform, and c) the tub is provided with a downward directed skirt that surrounds the upper portion of the apparatus for raising and lowering the platform, and the base is provided with an upward directed skirt that surrounds the lower portion of the apparatus for raising and lowering the platform and the upward directed skirt and the downward directed skirt telescope within each other to permit the raising and lowering of the platform without exposing the apparatus for raising and lowering the platform, and d) wherein the tub is provided with a basin surrounded with a rim at the top of the basin and the rim is provided with an entry that permits the easy entry of an animal into the tub when tub is in a lowered position.

2. The tub of claim 1 wherein the basin has a bottom and the bottom has incorporated therewith a stiffener panel.

3. The tub of claim 1 wherein the basin is provided with shelves upon which a removable platform is supported above water in the basin.

4. The tub of claim 1 wherein the skirt is provided with a cutout opening to permit the entry to be lowered into the skirt and the opening is provided with a retractable closure that covers the opening when the tub is in a raised position.

5. The tub of claim 1 wherein the tub has a wall side and an operator side and the rim on the wall side of the tub and the two sides adjacent to the wall side of the tub are raised to form an integral splash guard for the tub.

6. The tub of claim 5 wherein the entry is located on the operator side of the tub.

7. The tub of claim 5 wherein the wall side and the two adjacent sides of the splash guard are provided with stiffener panels to which attachments are securable.

8. An adjustable height animal bathing tub comprising:

a) a free standing, adjustable height stand having, a base that is parallel to a floor and that is supported by the floor, a platform that is above the base and is substantially parallel to the base, apparatus for raising and lowering the platform relative to the base connected between the platform and the base, b) a light weight animal bathing tub secured to the platform, and c) the tub is provided with a downward directed skirt that surrounds the upper portion of the apparatus for raising and lowering the platform, and the base is provided with an upward directed skirt that surrounds the lower portion of the apparatus for raising and lowering the platform and the upward directed skirt and the downward directed skirt telescope within each other to permit the raising and lowering of the platform without exposing the apparatus for raising and lowering the platform, and d) wherein the tub is provided with a basin surrounded with a rim at the top of the basin and the rim is provided with an entry that permits the easy entry of an animal into the tub when tub is in a lowered position, and e) wherein the basin has a bottom and the bottom has incorporated therewith a stiffener panel, and f) wherein the basin is provided with shelves upon which a removable platform is supported above water in the basin, and g) wherein the skirt is provided with a cutout opening to permit the entry to be lowered into the skirt and the opening is provided with a retractable closure that covers the opening when the tub is in a raised position.

9. The tub of claim 8 wherein the tub has a wall side and an operator side and the rim on the wall side of the tub and the two sides adjacent to the wall side of the tub are raised to form an integral splash guard for the tub, and a) wherein the entry is located on the operator side of the tub, and b) wherein the wall side and the two adjacent sides of the splash guard are provided with stiffener panels to which attachments are securable.

* * * * *